Patented Apr. 4, 1944

2,346,072

UNITED STATES PATENT OFFICE 2,346,072

PRODUCTION OF SILAGE

Sidney B. Haskell, Larchmont, N. Y., and Edward W. Harvey, Highland Park, N. J., assignors to Allied Chemical & Dye Corporation, New York, N. Y., a corporation of New York No Drawing. Application February 14, 1942, Serial No. 430,926

3 Claims. (Cl. 99—8)

This invention is directed to the preparation of silage from grasses.

Silage is commonly made by cutting up green plants and storing the material closely packed in silos. During storage fermentation takes place through bacterial action accompanied by the evolution of heat in the stored mass. Certain plants, such as corn, contain sufficient sugar which, by the bacterial fermentation, is changed to organic acids in amount adequate to preserve the silage without making it unsuitable for feeding to livestock. Silage made from green grasses such as timothy, alfalfa, clover, cow peas, field peas, soy beans, oats, rye, wheat, barley, true grasses, etc., is low in sugar and does not keep well in storage. To overcome the poor keeping quality of grass silage, preservatives have been added to the grass at the time of putting it into the silo. These preservatives have included molasses, sulfuric acid and phosphoric acid. The use of these liquid preservatives, however, has been expensive and troublesome to the farmer.

We have now discovered that certain acid phosphates may be used in limited amounts as preservatives for grass silage without making the silage unpalatable to livestock. These acid phosphates are the mono- and di-ammonium phosphates, urea acid phosphate and the monobasic phosphates of sodium, potassium, calcium and magnesium. These are all acid salts of ortho-phosphoric acid. The amount of a preservative which should be added to silage for it to keep well during storage will vary, depending upon the grass used in making the silage and conditions of its preparation and storage. We have found that from 0.2% to 2% of these acid phosphates added to grass to be stored in a silo will act as preservatives of the silage. At the same time, these amounts of the acid phosphates are tolerated by the livestock and do not make the silage unpalatable.

We have further discovered that by using certain of the above acid phosphates as preservatives for grass silage, one may at the same time increase the nutritional value of the silage. These acid phosphates which we have found to be preservatives for grass silage and to increase its nutritional value are the mono- and di-ammonium phosphates and urea acid phosphate. These ammonium or urea acid phosphates may be incorporated in the silage in amounts up to 2% of the grass without making the silage unpalatable and without exceeding the limit which livestock may utilize or tolerate of ammonia or urea and their secondary products under varying conditions of feeding. If it should be desired to add to the grass a preservative in addition to the acid phosphates used in practicing our invention, any of the known preservatives for silage, such as molasses, phosphoric acid or sulfuric acid, may be added to the grass in addition to 0.2% to 2% of the above acid phosphates.

Our invention, therefore, comprises the use as a preservative for grass silage of mono- or di-ammonium phosphate, urea acid phosphate, mono-calcium phosphate, mono-sodium phosphate, mono-potassium phosphate or mono-magnesium phosphate. Our invention further comprises the use of mono- or di-ammonium phosphate or urea acid phosphate both as a preservative and to increase the feeding value of the silage. The quantity of the aforementioned acid phosphates of sodium, potassium, calcium, magnesium, ammonium or urea which may be incorporated with the grass for practical purposes is not more than about 2%.

The use of acid phosphates as preservatives for grass silage in accordance with this invention provides a convenient method for shipping to the farmer a solid preservative which is conveniently and easily added by him to the grass at the time of packing it into the silo. The solid salts may be added in comminuted form to the grass or they may be dissolved in water and the solution added to the grass as it is introduced into the silo. The use of the ammonium or urea phosphates in addition to their preservative action adds to the silage a cheap form of nitrogen assimilable by or converted to proteins in ruminants such as cattle and sheep. They improve the feeding value of the grass silage which is often of low protein content.

As a particular example of the preparation of silage employing this invention, alfalfa is prepared for storage in a silo by the ordinary methods heretofore employed, except that for every 2000 pounds of alfalfa 16 pounds of mono-ammonium phosphate is mixed with the cut alfalfa, either as solid salt distributed through the cut mass or as a solution in water sprayed on the material as it is delivered into the silo. This quantity of mono-ammonium phosphate acts both to preserve the silage and as a source of nitrogen ultimately assimilable by the livestock fed on the silage.

In the foregoing example the quantity of mono-ammonium phosphate added to the alfalfa may be reduced to 8 pounds of the phosphate salt for every 2000 pounds of alfalfa and 30 pounds of molasses added for every 2000 pounds of the alfalfa as a supplemental preservative. The mono-ammonium phosphate acts as a preservative, supplemented by the molasses, and adds to the alfalfa nitrogen assimilable by the livestock.

The following are representative formulae for the proportions of acid phosphates which, in accordance with our invention, may be added to a grass to be introduced into a silo:

Formula I

| | Pounds |
|---|---|
| Grass | 2,000 |
| Mono-calcium acid phosphate [CaH₄(PO₄)₂.H₂O] | 20.0 |

Formula II

| | Pounds |
|---|---|
| Grass | 2,000 |
| Urea phosphate [(NH₂)₂CO.H₃PO₄] | 28.0 |

Formula III

| | Pounds |
|---|---|
| Grass | 2,000 |
| Mono-ammonium phosphate (NH₄H₂PO₄) | 20.0 |

Formula IV

| | Pounds |
|---|---|
| Grass | 2,000 |
| Mono-calcium acid phosphate [CaH₄(PO₄)₂.H₂O] | 7.0 |
| Urea phosphate [(NH₂)₂CO.H₃PO₄] | 10.0 |
| Mono-ammonium phosphate (NH₄H₂PO₄) | 5.0 |

Formula V

| | Pounds |
|---|---|
| Grass | 2,000 |
| Mono-calcium acid phosphate [CaH₄(PO₄)₂.H₂O] | 10.5 |
| Molasses | 30.0 |

Formula VI

| | Pounds |
|---|---|
| Grass | 2,000 |
| Mono-ammonium phosphate (NH₄H₂PO₄) | 10.0 |
| Molasses | 30.0 |

Formula VII

| | Pounds |
|---|---|
| Grass | 2,000 |
| Urea phosphate (CH₄ON₂.H₃PO₄) | 15.0 |
| Molassess | 30.0 |

Under some conditions, it may be advantageous to add to the grass considerably more of the acid phosphates than given in the above formulae, depending upon the size of animal to be fed and the total amount of silage to be fed per day.

Considerably greater amounts of molasses than those given above may be used without ill effect, either on the curing of the silage or on the health of the animal to which the silage is fed.

The use of the phosphate preservatives and feeding supplements of our invention is not limited to any particular method for preparing and storing grass silage. This may be prepared by any of the conventionl methods heretofore used for the preparation and storage of silage. As stated, our invention is directed to the preparation of grass silage, in which class we include those silages prepared from green grasses and legumes which, in contrast to corn silage, are low in sugar. The acid phosphates are added to the grass in amounts within the tolerance of livestock for the acid phosphates; the quantity is thus generally limited to not substantially more than 2% of the phosphate salt. Preferably, about 1% of any one or a mixture of the hereinabove mentioned acid phosphates is added to grass used in the preparation of silage. Also, the more acidic phosphates are preferably employed; thus, mono-ammonium phosphate is preferred to di-ammonium phosphate.

We claim:

1. The process for increasing the feeding value of grass silage and preserving the same which comprises incorporating in grass to be stored in a silo 0.2% to 2% of an acid salt from the group consisting of mono-ammonium and di-ammonium phosphates and urea acid phosphate.

2. The process for increasing the feeding value of grass silage and preserving the same which comprises adding to grass to be stored in a silo 0.2% to 2% of ammonium acid phosphate.

3. The process for increasing the feeding value of grass silage and preserving the same which comprises adding to grass to be stored in a silo 0.2% to 2% of urea acid phosphate.

SIDNEY B. HASKELL.
EDWARD W. HARVEY.